United States Patent Office 3,069,232
Patented Dec. 18, 1962

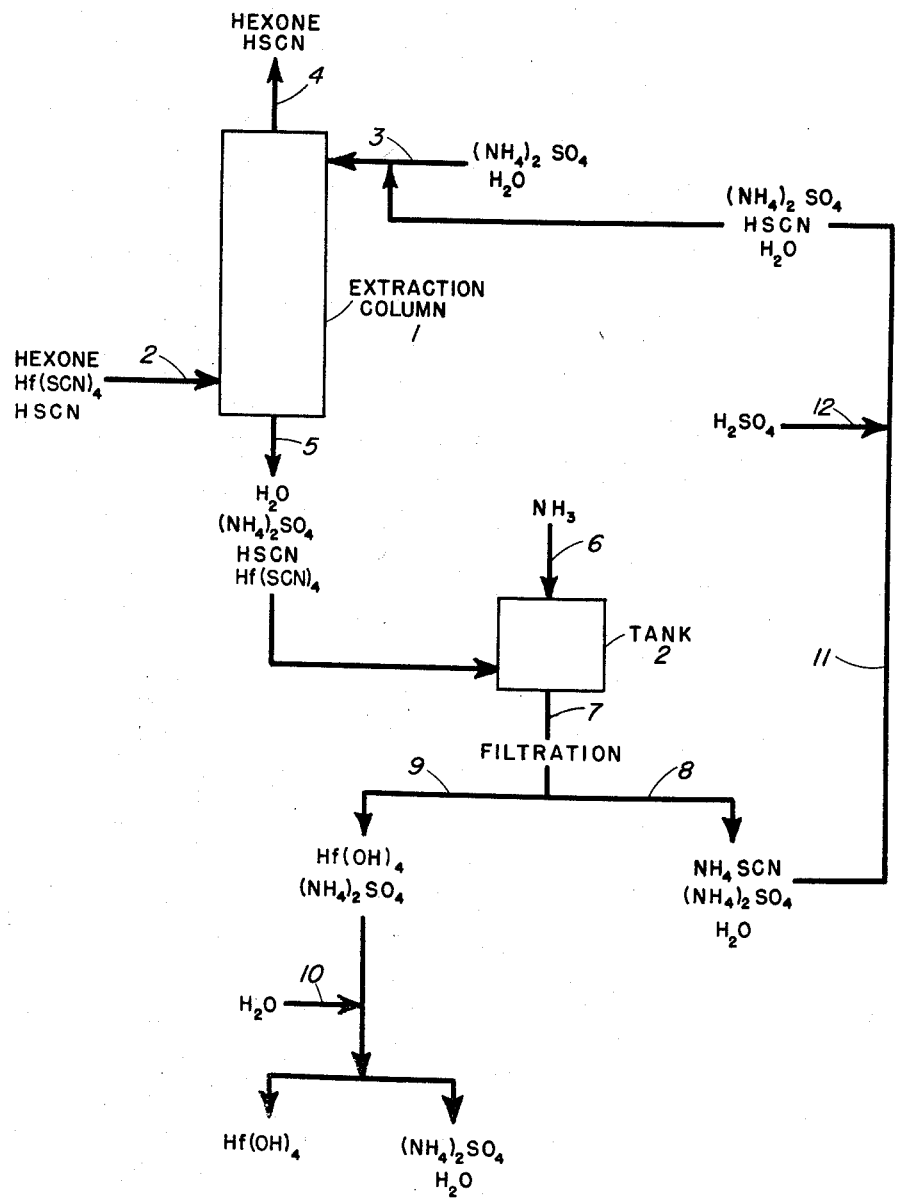

3,069,232
RECOVERY OF HAFNIUM VALUES
Harry Greenberg, Cincinnati, and Raymond A. Foos, Loveland, Ohio, assignors to National Distillers and Chemical Corporation, New York, N.Y., a corporation of Virginia
Filed July 14, 1959, Ser. No. 826,936
4 Claims. (Cl. 23—140)

This invention relates to a new and improved method for recovering hafnium values from solutions containing the same. More particularly, the invention relates to a method for separating hafnium values from organic solutions in an easily filterable form.

In recent years methods for the separation of hafnium from zirconium metals which are normally associated together in nature and which are difficult to separate from each other, have become very important due to increased demands for the production of high grade hafnium and zirconium metals and compounds. One of the most successful methods involves the preferential solvent extraction of hafnium as a thiocyanate complex. This process is based primarily on the work of Fischer et al. which is described in "Z. anorg. Chem.," 255, pages 79–100, and pages 277–286 (1947). In general, this process comprises extracting an aqueous solution of hafnium and zirconium sulfate containing ammonium thiocyanate with an ether solution of thiocyanic acid to obtain an organic layer containing the hafnium. In a later development, it was found that methyl isobutyl ketone, often referred to as hexone, could be used in place of the ether to achieve improved results as indicated by separation factors as high as 80.

The organic layer, or hafnium concentrate, will usually contain the equivalent of about 0.1 to 0.3 gram per liter of hafnium oxide. Heretofore, the hafnium values have been recovered from this organic solution by stripping with a 15 to 20% sulfuric acid solution employing an organic to aqueous phase ratio of about 10 to 1. This process required about 10 to 30 pounds of sulfuric acid per pound of hafnium in order to prevent the extraction of the thiocyanic acid into the aqueous phase. The use of the highest possible sulfuric acid concentration permits extraction of the $Hf(SCN)_4$ into the aqueous phase while preventing the extraction of the HSCN. The resulting filtrate is treated with ammonia, about 5 to 15 pounds of ammonia per pound of hafnium, to precipitate hafnium hydroxide in a gelatinous form which is difficult to settle and filter. In actual operations, it was found that this method of separating the hafnium values from the organic phase requires the use of large quantities of both sulfuric acid and ammonia. This leads to the production of large quantities of $(NH_4)_2SO_4$ causing serious disposal problems. Another disadvantage to this process is the low yields of hafnium obtained, in the range of 30 to 70%, resulting from the difficult settling and filtering operations as well as the high losses encountered in the subsequent calcination step.

One object of this invention is to provide an economical process for separating hafnium values from the aforementioned organic phase which avoids the difficulties encountered in the prior art process. Another object of this invention is to provide such a separation process which utilizes considerably less sulfuric acid and ammonia than the prior art process. A further object of the invention is the achievement of outstanding hafnium value recoveries. Other objects of the invention will become apparent from the ensuing description.

In accordance with the present invention, it has been found that these objects can be readily accomplished by utilizing a saturated, aqueous solution of ammonium sulfate, $(NH_4)_2SO_4$, instead of sulfuric acid to extract the hafnium values from the above-described organic phase. It will be understood, therefore, that the use of ammonium sulfate as an extractant for the hafnium values is a critical feature of this invention. In carrying out the process of this invention, it is essential that the saturated aqueous solution of ammonium sulfate also extract some but not all of the thiocyanic acid from the feed solution. The extract phase will contain about 5 to 8% by weight of thiocyanic acid in addition to the ammonium sulfate and the hafnium values. The extract phase is next treated with gaseous ammonia, which reacts with the thiocyanic acid and the hafnium thiocyanate to form simultaneously ammonium thiocyanate and hafnium hydroxide. The formation of the ammonium thiocyanate at this stage is of the utmost importance, since it results in the coprecipitation of an equivalent amount of the ammonium sulfate with the hafnium hydroxide. This coprecipitation of finely divided ammonium sulfate acts as filter aid in precipitating the hafnium hydroxide in an easily filterable form.

The hafnium-containing organic solutions, which are to be treated in accordance with the process of this invention will generally contain the following constituents:

|  | Moles/Liter | Percent by wt. |
| --- | --- | --- |
| Methyl isobutyl ketone (hexone) | 12.0 | About 85. |
| Thiocyanic acid | 3 | About 15. |
| Hafnium thiocyanate | 0.001 | <1. |

The hafnium thiocyanate concentration may range from about 0.001 to 0.1 mole per liter.

In general, the process of this invention comprises extracting the hafnium-containing organic solution with the ammonium sulfate extractant in one or more stages, preferably at least three stages, in large scale operations, to selectively extract the hafnium values. Aqueous ammonium sulfate solutions are employed and contain about 30 to 50% by weight, preferably about 35 to 45% by weight, of ammonium sulfate. The ratio of aqueous extractant to organic phase will vary from about 1:20 to 1:5, preferably about 1 to 10. The organic phase will contain the methyl isobutyl ketone and the major portion of the thiocyanic acid. The resulting aqueous phase contains the hafnium values, a portion of the thiocyanic acid usually about 5 to 8 percent by weight, at least about 30 percent, preferably about 35 to 45 percent by weight of ammonium sulfate, and water. This aqueous phase is then treated with gaseous ammonia. The amount of ammonia employed will be sufficient to neutralize the aqueous phase, which will now contain hafnium hydroxide, ammonium sulfate and ammonium thiocyanate. The hafnium hydroxide coprecipitates from the resulting mixture with some ammonium sulfate and is easily filterable therefrom. This ease of filtration contributes to the high hafnium recoveries characteristic of the present process. Filtration rates of the resulting slurry were found to be three to five times the rate which was achieved in filtering the hafnium hydroxide precipitate obtained by the prior art process, i.e. in the absence of coprecipitated ammonium sulfate.

The ammonium thiocyanate which is formed when the ammonium sulfate extract phase is directly neutralized with the gaseous ammonia, is recovered in the filtrate following separation of the precipitated ammonium sulfate and hafnium hydroxide. The filtrate is acidified to a pH below about 3, preferably about 1 to 2, with a mineral acid such as sulfuric acid, to form additional ammonium sulfate and to liberate the thiocyanic acid which mixture can then be readily recycled to the extraction zone.

The precipitated ammonium sulfate and hafnium hydroxide, usually in slurry form, can be filtered utilizing conventional methods and apparatus. In recovering the hafnium values from the resulting filter cake it is possible to calcine directly at temperatures of about 100° to 500° C. to convert the hafnium hydroxide to the oxide form. Another possible method involves the removal of the ammonium sulfate from the hafnium hydroxide in the filter cake by reslurrying. In general, this method comprises redissolving the filter cake in a mineral acid such as hydrochloric acid, sulfuric acid and the like; and then selectively precipitating the hafnium hydroxide by the use of such precipitants as phthalic acid, salicylic acid, mandelic acid, benzoic acid, etc. The amount of ammonium sulfate in the hafnium hydroxide filter cake also can be completely removed by efficient washing with water.

Although the use of methyl isobutyl ketone as the organic solvent in the feed mixture is preferred, other useful water-immiscible, oxygen containing organic solvents are as follows: diethyl ketone, cyclohexanone, tributyl phosphate, diethyl ether, diisopropyl ether, and amyl alcohol, etc.

For a more complete understanding of the invention, reference should now be made to the accompanying drawing which is a schematic showing of one method for carrying out the process of this invention.

With particular reference to the drawing there is provided an extraction column 1 and tank 2, which comprise conventional equipment for carrying out the operations described below in detail. It will be understood that in actual practice of the invention a number of extraction columns may be employed in series. In accordance with this invention, a feed material comprising hexone, hafnium thiocyanate and thiocyantic acid is passed via line 2 to the bottom portion of column 1. To the upper portion of column 1 an aqueous solution of ammonium sulfate is added via line 3. After contact, an organic phase comprising hexone and thiocyanic acid is removed from the top of column 1 via line 4. An aqueous phase comprising water, ammonium sulfate, thiocyanic acid, and hafnium thiocyanate is recovered via line 5 from the bottom portion of column 1.

This aqueous phase is then passed to tank 2 where it is contacted with gaseous ammonia added via line 6. The resulting reaction mixture is removed from tank 2 via line 7 and filtered. The filter cake contains hafnium hydroxide, formed in tank 1 by the reaction between hafnium thiocyanate and the ammonia, and ammonium sulfate. The filtrate, recovered via line 8, contains ammonium thiocyanate, ammonium sulfate and water. In general, the filtrate will have a pH of about 9 to 12, and usually about 9.5 to 10. Although the filtrate may be discarded, it is preferably recycled via lines 11 and 3 to the top of column 1 as shown. In order to insure the recovery of the major proportion of the thiocyanic acid in the organic phase, the filtrate is acidified with sulfuric acid (via line 12) to a pH of less than about 3, and preferably about 1 to 2, prior to recycling. By operating in this manner, it was found that the amount of ammonium sulfate recycled to column 1 was at least equivalent to the amount removed from the system in the filter cake.

Referring again to the filter cake recovered via line 9, it was found that the ammonium sulfate present therein could be removed readily by washing with water added via line 10. The resulting aqueous solution can either be discarded or recycled to column 1 (not shown).

It will be apparent that the process can be carried out in a continuous or semi-continuous manner.

The invention is further explained by the following examples which are intended for purposes of illustration and are not intended to be construed as limitations.

*Example I*

A feed solution of methyl isobutyl ketone 1140 cc. containing HCNS 177 g. and 0.815 g. Hf/liter was extracted at room temperature three times with 114 cc. of an aqueous solution containing 41% $(NH_4)_2SO_4$.

The total volume of the extract was 380 cc. and contained 19.5% of the HCNS contained in the feed solution, 6.5% per extraction. Neutralization with gaseous $NH_3$ gave an easily filterable $Hf(OH)_4$ precipitate, which when washed and calcined weighed 0.79 g. of $HfO_2$, or 97% recovery of the hafnium.

*Example II*

A three-stage multi-contact extraction employing fresh strip liquor each time and an acqueous organic ratio of 1:10 gave the following results using 1140 cc. of the feed solution used in Example I and 114 cc. saturated $(NH_4)_2SO_4$ solution. The hafnium content of the feed solution was 0.815 gram.

| Extract | Vol. extract, cc. | Percent HCNS ext. | Percent Hf ext. |
| --- | --- | --- | --- |
| 1 | 124 | 6.5 | 80 |
| 2 | 129 | 6.5 | 17 |
| 3 | 127 | 6.5 | 3 |

*Example III*

A solution of 177 g. HSCN in methyl isobutyl ketone was prepared by suspending 228.3 g. $NH_4SCN$ (3 moles) in 1000 ml. of methyl isobutyl ketone in a 2000 cc. separatory funnel, adding enough water to dissolve the ammonium salt and adding 250 ml. of 35% HCl (3 moles). An aqueous slurry of ammonium chloride crystals and a solution of thiocyanic acid were formed by shaking. The water and $NH_4Cl$ were then withdrawn from the funnel. A small quantity of distilled water (25 cc.) was added, and the separatory funnel shaken to dissolve almost all residual contaminating ammonium chloride and free hydrochloric acid. This was withdrawn and discarded. The resultant solution of thiocyanic acid had a volume of 1140 ml. To this solution was added 0.815 g. of hafnium in the form of $HfOCl_2 \cdot 8H_2O$.

A solution of ammonium sulfate was made by dissolving 500 g. $(NH_4)_2SO_4$ in enough water to make 1 liter of solution.

Three extraction using 114 ml. of the ammonium sulfate solution each time were made by shaking for 3 minutes allowing about 2 minutes for settling and the aqueous layer withdrawn and measured thus:

| | In, ml. | Out, ml. |
| --- | --- | --- |
| 1st. Extn | 114 | 124 |
| 2nd Extn | 114 | 129 |
| 3rd Extn | 114 | 127 |

Each extract was neutralized with gaseous ammonia, cooled and filtered. The filter cake in each case was a mixture of easily filterable $(NH_4)_2SO_4$ and $Hf(OH)_4$.

Analysis of each aqueous phase fraction gave:

| | $HfO_2$ | HSCN, g. |
| --- | --- | --- |
| 1 | 0.7656 | 11.55 |
| 2 | 0.1652 | 13.30 |
| 3 | 0.00 | 12.70 |

The recovered $HfO_2$ 0.9308 g. is equivalent to 0.79 g. hafnium or a percentage recovery of 97.0%. Each extraction removed about 6.5% of the contained HSCN in the form of $NH_4SCN$, which could be recycled without loss.

While particular embodiments of this invention are shown above, it will be understood that the invention is obviously subject to variations and modifications without departing from its broader aspects.

What is claimed is:

1. A method for recovering hafnium values from an organic solution comprising about 0.001 to 0.1 mole per liter of hafnium thiocyanate; a water-immiscible, oxygen-containing, organic solvent; and thiocyanic acid which comprises extracting said organic solution with an aqueous solution of ammonium sulfate containing about 30 to 50 weight percent of ammonium sulfate to obtain an organic phase containing said organic solvent and a major proportion of said thiocyanic acid and an aqueous extract phase containing at least 30 weight percent of said ammonium sulfate, about 5 to 8 weight percent of said thiocyanic acid, and said hafnium thiocyanate, the ratio of aqueous extractant to organic phase being from about 1:20 to 1:5, treating said extract phase with sufficient gaseous ammonia to at least neutralize said aqueous extract phase and to coprecipitate ammonium sulfate and hafnium hydroxide; separating said coprecipitate from the reaction mixture; and recovering the hafnium hydroxide from the coprecipitate.

2. The method of claim 1 wherein said organic solvent is hexone.

3. The method of claim 1 wherein said coprecipitate is separated from the reaction mixture by filtration, the resulting filtrate is acidified to a pH of less than about 3, and said acidified filtrate is recycled to the initial step of extracting the hafnium thiocyanate from the organic solution.

4. The method of claim 3 wherein said filtrate is acidified with sulfuric acid to a pH within the range of about 1 to 2.

References Cited in the file of this patent

UNITED STATES PATENTS

| | | |
|---|---|---|
| 2,566,665 | Huffman et al. | Sept. 4, 1951 |
| 2,757,081 | Hure et al. | July 31, 1956 |

OTHER REFERENCES

Hampel, C. A.: "Rare Metals Handbook," Reinhold Publ. Corp., New York, 1954, pp 180.

Ramsey, J. W., et al.: "Production of Zirconium at Y–12," U.S. Atomic Energy Commission Report No. Y–817, October 12, 1951, page 12.

Overholser, L. G., et al.: "Separation . . . Complexes. Part II," U.S. Atomic Energy Comm. Report No. Y–477, September 9, 1949, pp. 7, 8, 33 and 34.

Leaders, W. M.: "Summary of Progress on the Separation of Zi and Hf." U.S. Atomic Energy Comm. Report No. Y–449, July 22, 1949, p. 6.